Patented Mar. 19, 1940

2,194,399

UNITED STATES PATENT OFFICE 2,194,399

TETRAHYDROQUINOLINE DERIVATIVE

Hans Lange, Dessau in Anhalt, Germany, assignor to General Aniline & Film Corporation, a corporation of Delaware No Drawing. Application September 21, 1938, Serial No. 231,074. In Germany May 16, 1934

10 Claims. (Cl. 260—289)

In my prior Patent No. 2,075,347 I have disclosed a process for manufacturing tertiary amines of the benzene series which includes the step of treating certain secondary amines of the benzene series with epichlorhydrin at a temperature above 100° C., the temperature for obtaining the best yields being easily ascertainable for each secondary amine in question. In this process apparently an intermediate product is formed which may correspond to the general formula

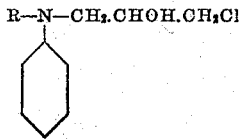

wherein R is an alkyl radicle with more than three carbon atoms and wherein the benzene nucleus may contain certain substituents.

My present invention comprises a development of these researches and is based on the observation that the reaction may be given different direction, so that by formation of a closed ring from the attached epichlorhydrin radicle tetrahydro-3-hydroxyquinoline derivatives are produced. This effect is obtained by the use of higher temperatures as necessary for the formation of the γ-chlor-β-hydroxypropyl alkylamino benzene compounds and by continuing the heating until the formation of hydrochloric acid has ceased.

This reaction may be supposed to take the following course:

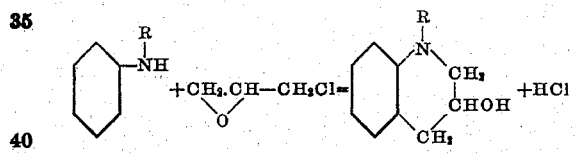

wherein R means an alkyl or aralkyl radicle and wherein the benzene nucleus may contain further substituents, such as halogen, the alkyl or alkoxy group, such substituents being preferably in meta-position to the amino group thus enhancing the reactivity of the hydrogen in ortho-position for the ring formation.

My process is applicable to all secondary amines of the benzene series and therefore to alkylamines and aralkylamines so far as there is no hindrance to the ring formation due to the position of a nuclear substituent in ortho-position to the amino group.

My process may be conducted in the presence or absence of a solvent and at the ordinary pressure or at a raised pressure. The quinoline bases are preferably isolated by subsequent treatment of the mixture produced by the reaction with alkali and distillation in a vacuum of the oil thus separated; however, the isolation may be effected by direct vacuum distillation.

The tetrahydroquinoline derivatives obtained are useful for making dyes. Thus, they may be used as coupling components in the manufacture of azo dyes. My new bases per se have a good affinity for cellulose acetate silk and thus they are taken up by the said silk when treating the latter in an aqueous suspension of the bases. They are not removed from the silk by washing, but may be developed to form dyeings by a treatment with a diazo compound such as obtainable, for instance, by diazotizing a nitroamino compound of the benzene series. Since these bases in contradistinction to similar compounds couple but once with diazo compounds, a clear and uniform dyeing is obtained.

Furthermore, the new tetrahydrohydroxyquinolines are valuable intermediate products for the manufacture of photograph developing agents, which may be obtained by introducing a hydroxy or amino group into the benzene nucleus in paraposition to the nitrogen. By dehydration quinolines are obtainable which are of value in the preparation of pharmaceutical products.

This application is a continuation-in-part of my prior application Serial No. 12,494, filed March 22, 1935.

The following examples illustrate the invention, the parts being by weight:

*Example 1.*—119 parts of n-butylaminobenzene are heated together with 225 parts of epichlorhydrin for 6 hours at 130 to 140° C. The mass is allowed to cool, dilute caustic soda lye (120 parts of caustic soda in 1000 parts of water) is added and the mass is heated by passing steam through. After cooling the oil is extracted with ether and the ethereal solution distilled in a vacuum. There are obtained 90 parts of 1-butyl-3- hydroxy-tetrahydroquinoline of boiling point, under 9 millimetres pressure, 157 to 159° C.

Example 2.—135 parts of 1-methyl-3-ethylaminobenzene and 140 parts of epichlorhydrin are heated together with 150 parts of chlorobenzene for 10 hours in an oil bath at 130 to 140 C. An excess of caustic soda lye is then added and the mixture is distilled in steam. The residue is extracted with ether and the ethereal extract distilled in a vacuum. There are obtained 115 parts of 1-ethyl-3-hydroxy-7-methyltetrahydroquinoline of boiling point, under 10 millimetres pressure, 171 to 172° C.

In an analogous manner 1-methyl-3-propyl- or butylaminobenzene may be treated with epichlorhydrin. The 1-butyl-3-hydroxy-7-methyltetrahydroquinoline thus obtained forms a solid crystallized product which melts at 67° C.

Example 3.—111 parts of 1-chloro-3-butylaminobenzene and 112 parts of epichlorhydrin are heated together in a solid tube for 6 hours at 150 to 160° C. and for 4 hours at 170 to 180° C. The product is made alkaline and treated with steam, then extracted with ether and the ethereal extract distilled. There are obtained 100 parts of 1 - butyl-3-hydroxy-7-chlorotetrahydroquinoline of boiling point, under 11 millimetres pressure, 202 to 205° C.

Example 4.—183 parts of benzylaminobenzene and 280.5 parts of epichlorhydrin are heated together for 6 hours at 140 to 150° C. After treatment with alkali, 182 parts of 1-benzyl-3-hydroxy-tetrahydroquinoline of boiling point, under 11 millimetres pressure, 227° C., are obtained.

Example 5.—163 parts of 1-methyl-2-butylaminobenzene, 140 parts of epichlorhydrin and 150 parts of chlorobenzene are heated together in the oil bath at 130 to 140° C. The mass is made alkaline and distilled in steam, the residue is extracted with ether and the ethereal extract is distilled in a vacuum. There are obtained 126 parts of 1-butyl-3-hydroxy-8-methyl-tetrahydroquinoline of boiling point, under 10 millimetres pressure, 175 to 176° C.

What I claim is:
1. The process which comprises treating a secondary amine of the general formula

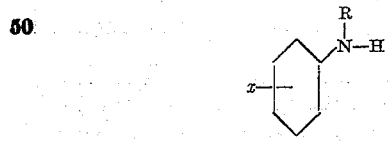

wherein R means a member of the group consisting of an alkyl and benzyl radicle, and wherein x stand for a member of the group consisting of hydrogen, halogen, the alkyl and alkoxy group, at least one ortho-position with respect to the amino group being free from such a substituent, with epichlorhydrin at a temperature sufficiently high for formation of hydrochloric acid according to the equation

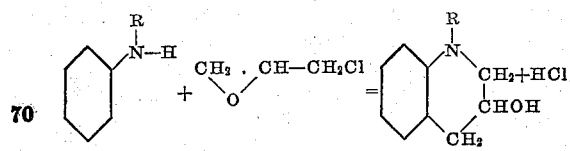

and continuing this treatment until the formation of hydrochloric acid has ceased.

2. The process which comprises treating a secondary amine of the general formula

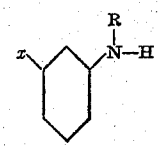

wherein R means a member of the group consisting of an alkyl and benzyl radicle and wherein x means a member of the group consisting of hydrogen, the alkyl-, alkoxy group and halogen, with epichlorhydrin at a temperature sufficiently high for formation of hydrochloric acid according to the equation

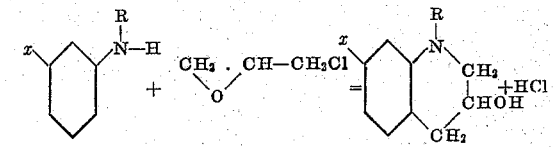

and continuing this treatment until the formation of hydrochloric acid has ceased.

3. The process which comprises treating a secondary amine of the general formula

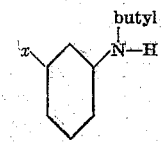

wherein x means a member of the group consisting of hydrogen, the alkyl-, alkoxy group and halogen, with epichlorhydrin at a temperature sufficiently high for formation of hydrochloric acid according to the equation

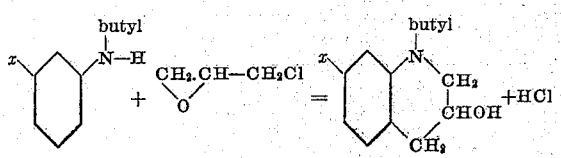

and continuing this treatment until the formation of hydrochloric acid has ceased.

4. The process which comprises treating 1-methyl-3-butylaminobenzene with epichlorphydrin at a temperature sufficiently high for the formation of hydrochloric acid and continuing this treatment until the formation of hydrochloric acid has ceased.

5. The process which comprises treating 1-chlor-3-butylaminobenzene with epichlorhydrin at a temperature sufficiently high for the formation of hydrochloric acid and continuing this treatment until the formation of hydrochloric acid has ceased.

6. The tetrahydrohydroxyquinolines of the general formula

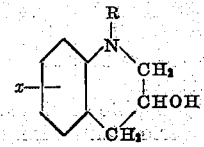

in which R is a member of the group consisting of an alkyl and benzyl radicle and in which $x$ stands for a member of the group consisting of hydrogen, halogen, the alkyl- and alkoxy group.

7. The tetrahydrohydroxyquinolines of the general formula

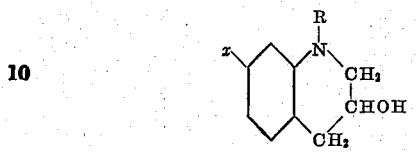

in which R is a member of the group consisting of an alkyl and benzyl radicle and in which $x$ is a member of the group consisting of hydrogen, the alkyl-, alkoxy group and halogen.

8. The tetrahydrohydroxyquinolines of the general formula

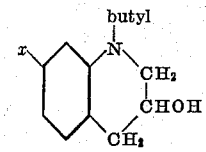

wherein $x$ is a member of the group consisting of hydrogen, the alkyl-, alkoxy group and halogen.

9. 1-butyl-3-hydroxy-7-methyltetrahydroquinoline forming a crystallized product melting at 67° C.

10. 1-butyl-3-hydroxy-7-chlorotetrahydroquinoline forming a liquid which boils under 11 mm. pressure at 202 to 205° C.

HANS LANGE.